United States Patent
Li et al.

(10) Patent No.: US 12,413,681 B2
(45) Date of Patent: Sep. 9, 2025

(54) METHOD FOR BLACK LEVEL CORRECTION, NON-TRANSITORY COMPUTER-READABLE STORAGE MEDIUM, AND CHIP

(71) Applicant: Beijing Xiaomi Mobile Software Co., Ltd., Beijing (CN)

(72) Inventors: Jizhe Li, Beijing (CN); Shuyan Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 214 days.

(21) Appl. No.: 18/218,965

(22) Filed: Jul. 6, 2023

(65) Prior Publication Data
US 2024/0297951 A1     Sep. 5, 2024

(30) Foreign Application Priority Data

Mar. 2, 2023   (CN) .......................... 202310188318.6

(51) Int. Cl.
*H04N 5/16*     (2006.01)
*G06T 7/80*     (2017.01)
(Continued)

(52) U.S. Cl.
CPC ............... *H04N 5/165* (2013.01); *G06T 7/80* (2017.01); *H04N 5/52* (2013.01); *H04N 23/74* (2023.01); *H04N 25/63* (2023.01)

(58) Field of Classification Search
CPC .......... H04N 5/165; H04N 5/52; H04N 23/74; H04N 25/63; H04N 23/45; H04N 23/73;
(Continued)

(56) References Cited

U.S. PATENT DOCUMENTS

| 8,090,181 B2 * | 1/2012 | Omi | ......................... G06T 5/50 |
| | | | 348/241 |
| 2005/0264684 A1 * | 12/2005 | Kamon | ................... H04N 23/76 |
| | | | 348/E5.041 |

(Continued)

FOREIGN PATENT DOCUMENTS

| CN | 105578082 A | 5/2016 |
| CN | 108259793 A | 7/2018 |

(Continued)

OTHER PUBLICATIONS

Combined Chinese Office Action and Search Report issued on Apr. 2, 2023 in Chinese Patent Application No. 202310188318.6 (with unedited computer-generated English translation), 6 pages.

(Continued)

*Primary Examiner* — Albert H Cutler
(74) *Attorney, Agent, or Firm* — Oblon, McClelland, Maier &Neustadt, L.L.P.

(57) ABSTRACT

A method for black level correction, including determining whether the first image sensor and/or the second image sensor triggers a calibration mode based on a calibration signal, performing, in response to the first image sensor triggering the calibration mode and the second image sensor not triggering the calibration mode, first image acquisition through the first image sensor based on a first automatic (Continued)

exposure configuration, and obtaining a calibration result by performing black level calibration, obtaining, in response to the first image sensor not triggering the calibration mode and the second image sensor triggering the calibration mode, an image to be processed by performing second image acquisition through the first image sensor based on a second automatic exposure configuration, and performing black level correction on the image to be processed based on the second automatic exposure configuration and the calibration result.

19 Claims, 7 Drawing Sheets

(51) Int. Cl.
    *H04N 5/52*         (2006.01)
    *H04N 23/74*       (2023.01)
    *H04N 25/63*       (2023.01)

(58) Field of Classification Search
    CPC ...... H04N 23/60; H04N 23/667; H04N 23/80; H04N 23/81; H04N 23/90; H04N 25/60; H04N 17/002; H04N 13/239; H04N 13/246; H04N 13/25; G06T 7/80
    USPC .................................................. 348/241, 243
    See application file for complete search history.

(56) References Cited

U.S. PATENT DOCUMENTS

| | | |
|---|---|---|
| 2005/0285952 A1 | 12/2005 | Kwon et al. |
| 2010/0110223 A1* | 5/2010 | Kobayashi ............. H04N 23/13 348/E9.051 |
| 2012/0268632 A1 | 10/2012 | Kamon et al. |
| 2014/0111482 A1* | 4/2014 | Kao ....................... G06F 3/0421 345/175 |
| 2016/0182840 A1* | 6/2016 | Iwasaki .................. H04N 25/61 348/243 |
| 2019/0280037 A1* | 9/2019 | Kanto ..................... H10F 19/50 |

FOREIGN PATENT DOCUMENTS

| | | |
|---|---|---|
| CN | 109348147 A | 2/2019 |
| CN | 110365922 A | 10/2019 |
| CN | 110855913 A | 2/2020 |
| CN | 115720299 A | 2/2023 |
| JP | 2010-130331 A | 6/2010 |

OTHER PUBLICATIONS

Extended European Search Report issued on Jul. 17, 2023 in European Patent Application No. 23186629.4, 9 pages.

* cited by examiner

METHOD FOR BLACK LEVEL CORRECTION, NON-TRANSITORY COMPUTER-READABLE STORAGE MEDIUM, AND CHIP

CROSS REFERENCE TO RELATED APPLICATIONS

The present disclosure claims benefit of priority to Chinese Patent Application No. 2023101883186, filed on Mar. 2, 2023, and the entire contents of which are incorporated herein by reference.

BACKGROUND

Technical Field

The present disclosure relates to the technical field of digital image correction and display, and particularly to a method and an apparatus for black level correction, an electronic device, a chip and a storage medium.

Description of the Related Art

In the field of black level correction, a certain black level bias can be added to the sensor output signal. Reasonable black level data can ensure that the details of the dark region will not disappear due to insufficient precision of automatic exposure (AD) conversion components, which is also beneficial to protection of the dark current signal of the sensor, thus improving the noise suppression effect in the extremely dark region of the image, and avoiding changes in the signal distribution caused by the negative signal phase.

SUMMARY

According to embodiments of a first aspect of the present disclosure, there is provided a method for black level correction, and the method includes determining, by a terminal comprising a first image sensor and a second image sensor, whether the first image sensor and/or the second image sensor triggers a calibration mode based on the calibration signal, performing, in response to the first image sensor triggering the calibration mode and the second image sensor not triggering the calibration mode, first image acquisition through the first image sensor based on a first automatic exposure configuration, and obtaining a calibration result by performing black level calibration, obtaining, in response to the first image sensor not triggering the calibration mode and the second image sensor triggering the calibration mode, an image to be processed by performing second image acquisition through the first image sensor based on a second automatic exposure configuration, and performing black level correction on the image to be processed based on the second automatic exposure configuration and the calibration result.

According to embodiments of a second aspect of the present disclosure, there is provided a non-transitory computer-readable storage medium storing with a computer instruction, where the computer instruction is configured to enable a computer to execute the method according to the embodiments of the first aspect of the present disclosure.

According to embodiments of a third aspect of the present disclosure, there is provided a chip. The chip includes one or more interface circuits and one or more processors; the interface circuits are configured to receive code instructions and transmit the code instructions to the processors, and the processors are configured to run the code instructions to execute the method according to the embodiment of the first aspect of the present disclosure.

It is to be understood that the foregoing general description and the following detailed description are exemplary and explanatory and do not limit the present disclosure.

BRIEF DESCRIPTION OF THE DRAWINGS

The accompanying drawings, which are incorporated in and constitute a part of the description, illustrate embodiments consistent with the present disclosure, are used together with the description to explain the principles of the present disclosure, and do not constitute an improper limitation of the present disclosure.

DETAILED DESCRIPTION OF THE PREFERRED EMBODIMENTS

Figure 1:
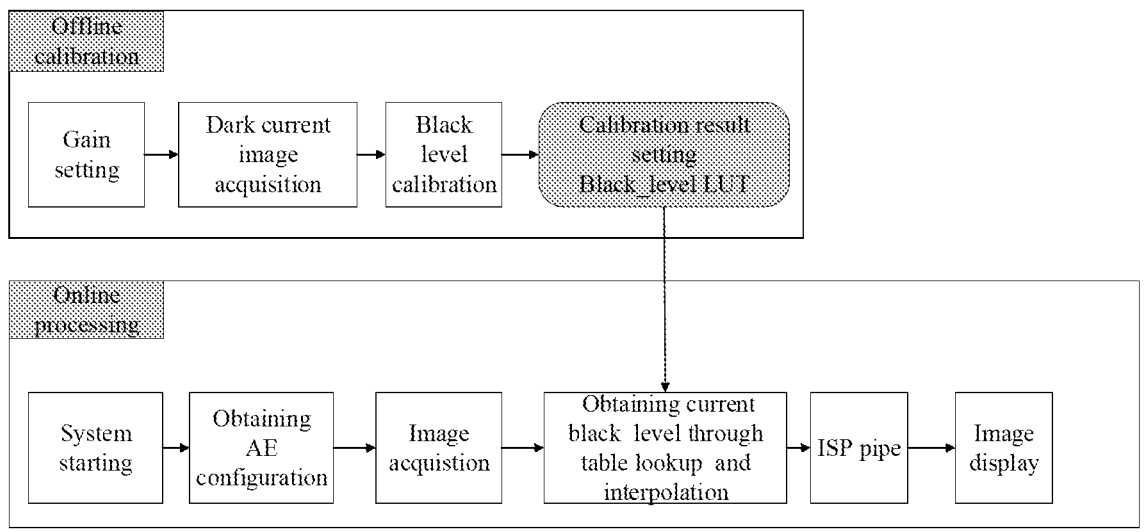
FIG. 1 is a schematic flowchart of a scheme for black level correction commonly used in the art.

Embodiments of the present disclosure will be described in detail below, and examples of the embodiments are illustrated in the drawings, where the same or similar reference numbers denote the same or similar elements or elements having the same or similar functions throughout. The embodiments described below with reference to the drawings are exemplary and are intended to explain the present disclosure, which should not be construed as limitation of the present disclosure.

At present, the demand for technology products in human society is increasing day by day, especially for digital technology products with display devices, such as mobile phones, cameras, TVs, and projectors. After meeting the basic needs, users have put forward higher requirements for displayed image quality, and especially in the field of mobile phone photography, the ultimate pursuit of the image quality is never-ending. It belongs to conventional operations in the art to add a certain black level bias to the sensor output signal. Reasonable black level data can ensure that the details of the dark region will not disappear due to insufficient precision of automatic exposure conversion components, which is also beneficial to protection of the dark current signal of the sensor, thus improving the noise suppression effect in the extremely dark region of the image, and avoiding changes in the signal distribution caused by the negative signal phase. The current technical scheme commonly used in the art is to obtain black level data by using offline calibration and configure it to a corresponding register during the product development phase. In the subsequent black level calibration process, the pre-calibrated result is directly used. However, many factors such as gain, temperature, and printed circuit board layout (PCB Layout) will affect the black level data, and this impact is random and unpredictable. If the black level data do not match the calibration data, it will have a serious impact on the image quality. Especially, it will cause color change and contrast change of the image.

Related processing flow in the art is shown in FIG. 1, in which the main feature is that the black level data is calibrated offline and written into the storage unit, and the black level data is obtained/fitted by interpolation during online black level correction. However, the offline calibration method for the black level data relies on professionals/developers to calibrate and write into the storage device during the project development stage. The black level calibrated by this method cannot fully adapt to the change of the black level. When the calibration result does not match the actual situation, it will seriously affect the image quality performance.

At present, there is an online correction scheme for black level, in which the data from the first frame to the Nth frame are processed through a high-speed mode to obtain a feedback value of the black level, and the data from the N+1th frame to the Mth frame are processed through a low-speed mode. The processing manner is to gradually adjust the level value to an ideal state by adjusting a correction step size for the black level, so as to avoid problems such as the brightness and color jump of the image caused by large-scale adjustment of the black level.

However, for the above-mentioned online correction scheme for the black level, firstly, the scheme requires the sensor to have an optical black region (OB, also known as a black level region) to support the black level correction during system operation, which limits the applicable scenarios of the technology. Secondly, the black level correction link is deployed on the analog signal end, before the analog-to-digital converter (ADC), and perform processing through a specific analog signal processor (ASP); however, for sensors with lower configuration, such as some sensors in security fields and some domestic sensors with no ASP function, since the scheme has a strong demand for ASP, the flexibility in sensor configuration is lower. Thirdly, since the black level will change with the temperature, when the temperatures of different regions of the sensor are different, the black level data in each region will be inconsistent; for example, the black level data close to the side or the end of the high-power component will be significantly higher than the other side or the other end, and the sensor processing process will also cause inconsistency of the black level of each region; therefore, the operation precision of performing black level calibration by means of the optical dark region in the scheme is insufficient.

In order to solve the problems existing in the related art, the present disclosure provides a method for black level correction. In the present scheme, calibration and correction can be performed through active pixels (AP) by reasonable control of the exposure components, which can get rid of the dependence on specific structures of the sensor (such as the optical dark region, etc.). The black level correction link of the present scheme is processed at the image signal processing (ISP) end, and the correction is performed for the digital signal, thus improving the adaptability of the sensor. Moreover, using active pixels for black level calculation can accurately obtain the black level of each pixel, thus obtaining more realistic and accurate results than the method of using specific regions or specific pixels for calibration.

Before introducing the detailed scheme of the present disclosure, the application scenarios of the scheme of the present disclosure will be described firstly.

It should be emphasized that the scheme of the present disclosure can be applied to the digital image processing process on hardware and software ends in the field of digital image chip processing or industrial camera imaging, especially to the design and development process of ISP Pipeline, and can also be applied to other similar digital image processing processes, which is not limited by the present disclosure.

Figure 2:
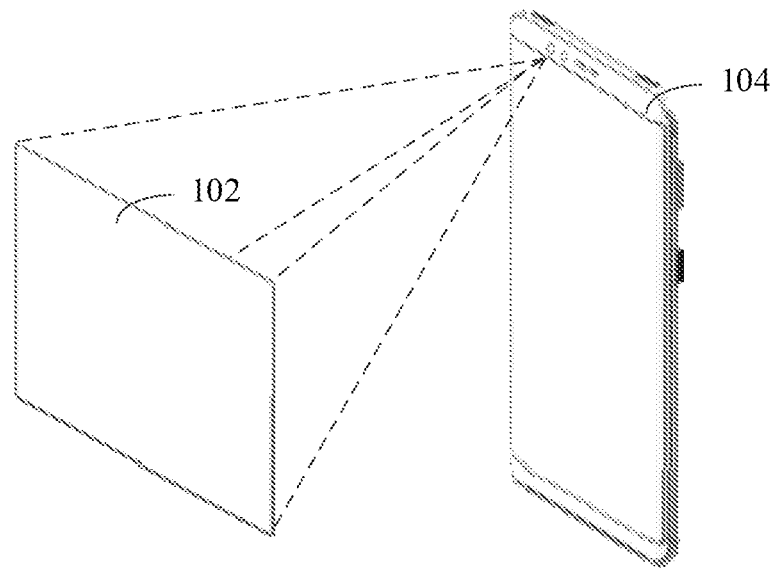
FIG. 2 is a schematic diagram of an application scenario according to some embodiments of the present disclosure.

FIG. 2 is an application scenario diagram of the method for black level correction according to some embodiments of the present disclosure. As shown in FIG. 2, the application scenario includes an electronic device 104. The electronic device 104 can be installed with a camera module, and can also be installed with several application programs. The application program can initiate an image acquisition instruction to obtain an image, and the camera module acquires the image 102. Among them, the camera module may include a front camera module and/or a rear camera module. Finally, the target image is sent to the target application program. Among them, the electronic device 104 may be a smart phone, a tablet computer, a personal digital assistant, a wearable device, and the like.

In some embodiments, the above-mentioned electronic device may also be an on-board device or a vehicle-to-everything device, such as a smart car, etc. In the present disclosure, a smart phone is used as an example, but it does not mean to limit the scope of the present disclosure.

The electronic device can be installed with cameras, and images can be obtained through the installed cameras. The cameras can be classified into laser cameras, visible light cameras and other types according to the different images obtained. Laser cameras can obtain images formed by irradiating laser light on objects, and visible light images can obtain images formed by irradiating visible light on objects. Several cameras can be installed on the electronic device, and the installation positions are not limited. For example, one camera can be installed on the front panel of the electronic device, and two cameras can be installed on the back panel. The cameras can also be installed inside the electronic device in an embedded manner, and then the cameras can be opened by rotating or sliding. In some embodiments, a front camera and a rear camera can be installed on the electronic device, and the front camera and the rear camera can obtain images from different perspectives. Generally, the front camera can obtain images from the front perspective of the electronic device, and the rear camera can obtain images from the back view of the electronic device.

It should be understood that, in the present disclosure, the front camera or the rear camera is used as an example to distinguish the shooting angles of different cameras, rather than limiting the functions of a plurality of cameras. The plurality of cameras in the present disclosure can be rear cameras simultaneously, or can be front cameras simultaneously, which is not limited in the present disclosure.

Several application programs can be installed in the electronic device. An application program refers to a software written in the electronic device for a certain application purpose. The electronic device can realize the service required by the user through the application program. When the application program needs to acquire images, it will initiate an image acquisition instruction, and the electronic device will call the camera module to acquire images according to the image acquisition instruction. The image acquisition instruction refers to an instruction for triggering an image acquisition operation.

The electronic device is also provided with a processor, and a black level correction module in the processor can perform correction processing on the image acquired by the camera module, for example, can execute the method for black level correction provided in the present disclosure.

Figure 3:
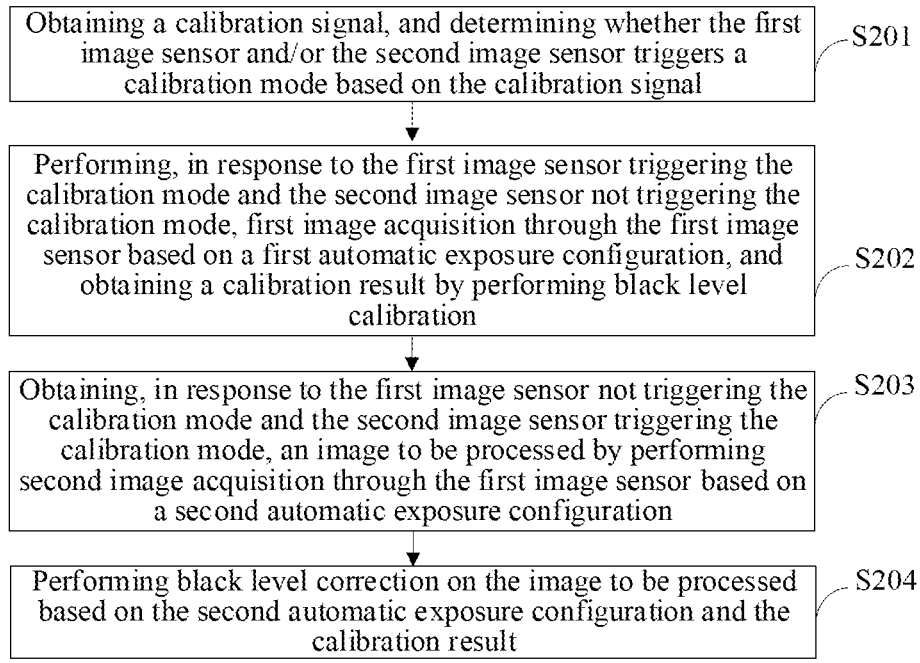
FIG. 3 is a flow chart of a method for black level correction according to some embodiments of the present disclosure.

FIG. 3 is a flow chart of a method for black level correction according to some embodiments of the present disclosure. The method is executed by a terminal, and the terminal includes a first image sensor and a second image sensor. As shown in FIG. 3, The method for black level correction includes steps S201 to S204.

In step S201, a calibration signal is obtained, and it is determined whether the first image sensor and/or the second image sensor triggers a calibration mode based on the calibration signal.

In the present disclosure, both the first image sensor and the second image sensor refer to one or more image sensors in the terminal, and the one or more image sensors referred to by the first image sensor and the second image sensor are not the same.

In some embodiments of the present disclosure, the calibration signal can be set according to the time interval for the sensor to trigger the calibration mode and the image frame number acquired during calibration, including the time interval for the first image sensor to trigger the calibration mode and the image frame number acquired during calibration and/or the time interval for the second image sensor to trigger the calibration mode and the image frame number acquired during calibration. Among them, the time intervals for the first image sensor and the second image sensor to trigger the calibration mode and the image frame numbers acquired during calibration can be set dynamically, and can be adjusted according to calibration and correction effects in practical application, which is not limited in the present disclosure.

In some embodiments of the present disclosure, when the calibration signal is set according to the time interval for the first image sensor to trigger the calibration mode and the image frame number acquired during calibration, the calibration signal is sent to the first image sensor according to the adjusted time interval for the first image sensor to trigger the calibration mode. When the first image sensor receives the calibration signal, it triggers the calibration mode, and performs image acquisition and black level calibration according to the image frame number acquired during calibration. Similarly, the time when the second image sensor enters the calibration mode, as well as the image frame number acquired during calibration, can be controlled through setting the calibration signal. Similarly, the time when the first image sensor and the second image sensor enter the calibration mode, and the image frame numbers acquired during calibration, can also be controlled at the same time through setting the calibration signal.

In step S202, in response to the first image sensor triggering the calibration mode and the second image sensor not triggering the calibration mode, first image acquisition is performed through the first image sensor based on a first automatic exposure configuration, and a calibration result is obtained by performing black level calibration.

In some embodiments of the present disclosure, when the second image sensor is working normally, that is, when the image acquired through the second image sensor will be sent to the display, it is considered that the second image sensor does not trigger the calibration mode. At this time, the remaining sensors (including the first image sensor) different from the second image sensor in the terminal can be controlled to trigger the calibration mode through the calibration signal. When the first image sensor triggers the calibration mode, first image acquisition is performed through the first image sensor based on a first automatic exposure configuration, and black level calibration is performed to obtain a calibration result, where the first automatic exposure configuration is obtained by synchronizing an automatic exposure configuration during normal operation of the second image sensor. In step S203, in response to the first image sensor not triggering the calibration mode and the second image sensor triggering the calibration mode, second image acquisition is performed through the first image sensor based on a second automatic exposure configuration, and an image to be processed is obtained.

In some embodiments of the present disclosure, in a batch of operations after step S202, when the first image sensor is working normally, that is, the image acquired through the first image sensor will be sent to the display, it is considered that the first image sensor does not trigger the calibration mode. At this time, the remaining sensors (including the second image sensor) different from the first image sensor in the terminal can be controlled to trigger the calibration mode through the calibration signal. When the second image sensor triggers the calibration mode, second image acquisition is performed through the first image sensor based on a second automatic exposure configuration, so as to obtain an image to be processed, where the second automatic exposure configuration is obtained according to the current setting of the device.

It should be noted that if there is no calibration signal set in the terminal, both the first image sensor and the second image sensor can work normally, without triggering the calibration mode. If there is a calibration signal set in the terminal within a certain period of time, when there are two image sensors in the terminal, there is no case that the first image sensor and the second image sensor both trigger the calibration mode or neither trigger the calibration mode. When there are more than two image sensors in the terminal, in response to the first image sensor and the second image sensor both triggering the calibration mode, at this time, there are other sensors different from the first image sensor and the second image sensor in the terminal, which do not trigger calibration and work normally. In response to neither the first image sensor nor the second image sensor triggering the calibration mode, at this time, the terminal may also control other sensors different from the first image sensor and the second image sensor to trigger the calibration mode.

In step S204, black level correction is performed on the image to be processed based on the second automatic exposure configuration and the calibration result.

In some embodiments of the present disclosure, the image to be processed is acquired by the first image sensor under the second automatic exposure configuration. In order to ensure the accuracy of the correction, when there is a certain batch of operations and the first image sensor performs black level calibration under the second automatic exposure configuration, it is possible to use the calibration result of the present black level calibration to perform black level correction on the image to be processed, so as to obtain a better correction effect.

In some embodiments of the present disclosure, in a batch of the operations before step S203, step S202 is triggered one or more times. When there is a case that the first automatic exposure configuration is the same as the second automatic exposure configuration, there is a calibration result of black level calibration performed by the first image sensor under the second automatic exposure configuration.

In some embodiments of the present disclosure, in a batch of the operations before step S203, step S202 is triggered one or more times. There may be no case that the first automatic exposure configuration is the same as the second automatic exposure configuration, and an interval including the second automatic exposure configuration can be determined based on the second automatic exposure configuration, ensuring that the boundary value of this interval is the first automatic exposure configuration. That is, there is a calibration result of black level calibration performed by the first image sensor under the boundary value of this interval. It is possible to obtain a calibration result of black level calibration performed by the first image sensor under the second automatic exposure configuration through interpolation processing, and then perform black level calibration on the image to be processed.

It should be noted that in the embodiments of the present disclosure, the calibration result obtained in step S202 may also be processed in other ways to obtain the calibration result, or an approximate value, of black level calibration performed by the first image sensor under the second automatic exposure configuration, for performing black level correction on the image to be processed, which is not limited by the present disclosure. To sum up. according to the method for black level correction provided in the present disclosure, online calibration and correction on multi-sensor black level is provided, avoiding decreased performance of color and permeability of the image caused by the black level data not matching the previous offline calibration data after the black level data change with factors such as gain configuration, ambient temperature, and device usage time.

Figure 4:
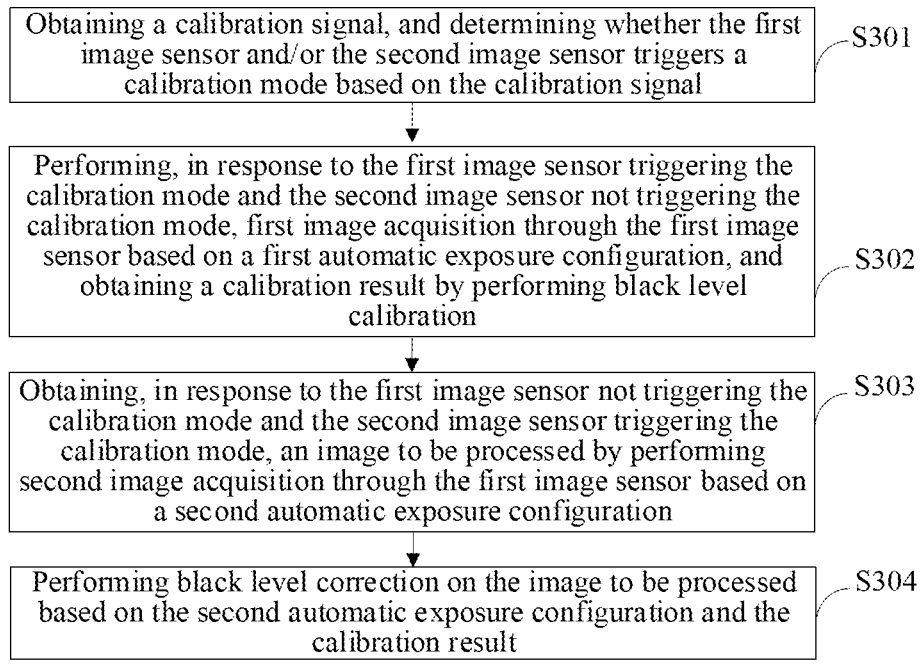
FIG. 4 is a flow chart of a method for black level correction according to some embodiments of the present disclosure.

Based on the embodiment shown in FIG. 3, FIG. 4 further shows a flowchart of a method for black level correction according to some embodiments of the present disclosure.

As shown in FIG. 4, the method includes the following steps S301 to S304, and the steps S301 to S304 are further disclosures of steps S201 to S204 in the embodiment shown in FIG. 3.

In step S301, a calibration signal is obtained, and it is determined whether the first image sensor and/or the second image sensor triggers a calibration mode based on the calibration signal.

In some embodiments of the present disclosure, obtaining the calibration signal includes: setting a calibration frequency for the first image sensor and/or the second image sensor, where the calibration frequency at least includes a calibration acquisition frequency and a calibration acquisition frame number, and the calibration acquisition frame number is greater than or equal to 1; and, obtaining the calibration signal based on the calibration frequency, where the calibration signal is used to instruct the first image sensor and/or the second image sensor to start the calibration mode.

Among them, the calibration acquisition frequency is the time interval for the first image sensor and/or the second image sensor to trigger the calibration mode, and the calibration acquisition frame number is the image frame number acquired by the first image sensor and/or the second image sensor during calibration.

It should be noted that the time interval for the first image sensor and the second image sensor to trigger the calibration mode and the image frame number acquired during calibration can be set dynamically, and can be adjusted according to the calibration and correction effects in practical applications, which are not limited in the present disclosure.

For example, if the time interval for the first image sensor to trigger the calibration mode is 2 s, a trigger field corresponding to the first image sensor in the calibration signal can be set to 1 every 2 s. The first image sensor receives the calibration signal and triggers the calibration mode. After the first image sensor performs black level calibration, this field is restored to 0). Therefore, the first image sensor triggers the calibration mode every 2 s according to the calibration signal, and it may be determined whether the first image sensor is in the calibration mode according to the calibration signal. Similarly, the calibration signal is obtained based on the time interval for the second image sensor to trigger the calibration mode, and it may be determined whether the second image sensor is in the calibration mode.

Furthermore, based on the calibration frequency, the calibration signal may include a calibration acquisition frame number corresponding to the current calibration acquisition frequency of the first image sensor and/or the second image sensor, which is used to indicate the image frame number acquired by the first image sensor and/or the second image sensor in calibration mode.

In step S302, in response to the first image sensor triggering the calibration mode and the second image sensor not triggering the calibration mode, first image acquisition is performed through the first image sensor based on a first automatic exposure configuration, and a calibration result is obtained by performing black level calibration.

In some embodiments of the present disclosure, performing first image acquisition through the first image sensor based on a first automatic exposure configuration, and obtaining a calibration result by performing black level calibration includes: obtaining the first automatic exposure configuration, where the first automatic exposure configuration at least includes a first gain configuration; obtaining a non-photosensitive image by closing an aperture of the first image sensor and performing image acquisition on an active pixel region through the first image sensor based on the first automatic exposure configuration and the calibration acquisition frame number of the first image sensor; and, obtaining the calibration result by performing black level calibration on the non-photosensitive image.

It should be noted that the first automatic exposure configuration is obtained by a current automatic exposure component, and the first automatic exposure configuration can be adjusted by controlling the automatic exposure component. The first image acquisition and black level correction are performed under different automatic exposure configurations.

Among them, according to step S301, it can be known that the calibration signal includes the calibration acquisition frame number corresponding to the current calibration acquisition frequency, and after the first image sensor triggers the calibration mode, the first image acquisition is performed based on the calibration acquisition frame number.

Figure 5:
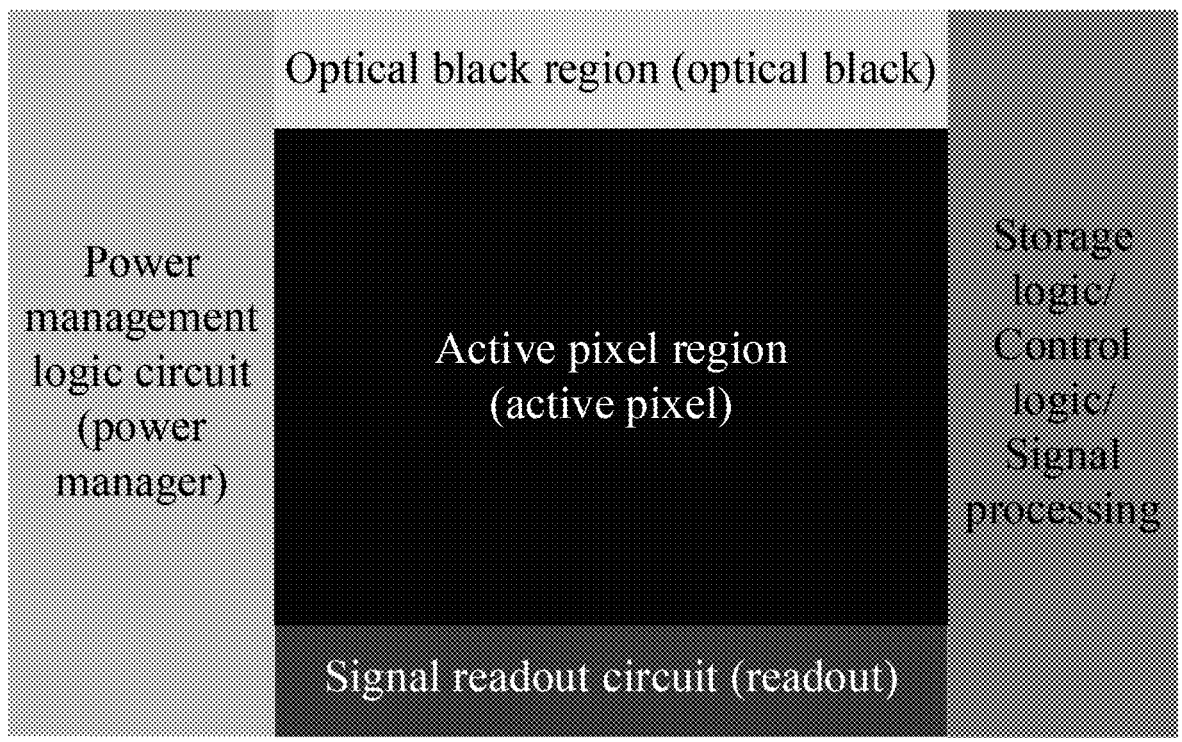
FIG. 5 is a conventional layout of sensor functional regions according to some embodiments of the present disclosure.

FIG. 5 shows a conventional layout of sensor functional regions, including: an active pixel region, which sense the light intensity of specific wavelengths and output corresponding image signals by means of a color filter array (CFA) covering on it, and by pixels of which the image finally displayed by a conventional imaging device is initially acquired; and, an optical black region, which is covered by metal and completely insensitive to light, and can output pixel values.

It should be emphasized that, in the existing scheme, the sensor must have an optical black region, and the data from the first frame to the Nth frame acquired in the optical black region are processed to obtain data for black level correction, and the data from the N+1th frame to the Mth frame are corrected, which may limit the structure of the sensor during application, thus adaptation being not flexible. Moreover, since the black level will change with the temperature, when the temperatures of different regions of the sensor are different, the black level data in each region will be inconsistent. The sensor processing process will also cause inconsistency of the black level of each region, and the operation precision of the black level calibration by means of the optical dark region is insufficient.

Therefore, in the present scheme, in the active pixel region, by closing the aperture of the first image sensor, a non-photosensitive image is acquired for performing black level calibration, and the black level of each pixel can be obtained accurately, thus obtaining more realistic and accurate calibration results.

In some embodiments of the present disclosure, obtaining the calibration result by performing black level calibration on the non-photosensitive image includes: obtaining a result image by performing time-domain superposition processing and averaging processing on the non-photosensitive image; and, taking a value of each pixel in the result image and the first gain configuration as the calibration result, where the value of each pixel in the result image is a black level value of each pixel in the image to be processed.

In some embodiments, the calibration acquisition frame number is set to 1, the black level calibration is performed in a way of space-domain calibration, and an averaging processing is performed on the acquired non-photosensitive image to obtain the result image.

In some embodiments, the acquisition frame number is set to be a plurality of frames. the black level calibration is performed in a way of time-domain calibration, and time-domain superposition processing and averaging processing are performed the acquired non-photosensitive image to obtain the result image.

It should be noted that the gain configuration is strongly related to the black level data, thus the value of each pixel in the result image and the first gain configuration are used as the calibration result, so as to facilitate search for the black level data obtained by performing black level calibration under different first automatic exposure configurations.

In step S303, in response to the first image sensor not triggering the calibration mode and the second image sensor triggering the calibration mode, second image acquisition is performed through the first image sensor based on a second automatic exposure configuration, and an image to be processed is obtained.

In some embodiments of the present disclosure, performing second image acquisition through the first image sensor based on the second automatic exposure configuration and obtaining the image to be processed includes: obtaining the second automatic exposure configuration, where the second automatic exposure configuration at least includes a second gain configuration; and, obtaining the image to be processed by opening an aperture of the first image sensor and performing image acquisition on an active pixel region through an image sensor based on the second automatic exposure configuration.

Among them, the second automatic exposure configuration is obtained by a current automatic exposure component, and the second automatic exposure configuration can be adjusted by controlling the automatic exposure component. The second image acquisition is performed under different automatic exposure configurations.

In the embodiment of the present disclosure, when the aperture is opened, the image to be processed is acquired through the active pixels. After performing black level correction and other subsequent image processing, the image to be processed will be sent to the display as the final displayed image for display (hereinafter referred to as "sending for display.").

In step S304, black level correction is performed on the image to be processed based on the second automatic exposure configuration and the calibration result.

In some embodiments of the present disclosure, in a batch of operations before step S303, step S302 is triggered one or more times. When there is a case that the first automatic exposure configuration is the same as the second automatic exposure configuration, there is a calibration result of black level calibration performed by the first image sensor under the second automatic exposure configuration.

In some embodiments of the present disclosure, in a batch of the operations before step S303, step S302 is triggered one or more times. There may be no case that the first automatic exposure configuration is the same as the second automatic exposure configuration, and an interval including the second automatic exposure configuration can be determined based on the second automatic exposure configuration, ensuring that the boundary value of this interval is the first automatic exposure configuration. That is, there is a calibration result of black level calibration performed by the first image sensor under the boundary value of this interval. It is possible to obtain a calibration result of black level calibration performed by the first image sensor under the second automatic exposure configuration through interpolation processing, and then perform black level calibration on the image to be processed.

To sum up, according to the method for black level correction provided in the present disclosure, online calibration and correction on multi-sensor black level can be completed, avoiding decreased performance of color and permeability of the image caused by the black level data not matching the previous offline calibration data after the black level data change with factors such as gain configuration, ambient temperature, and device usage time. By controlling the exposure component to perform calibration and correction in the active pixels, it is possible to get rid of the dependence on the specific structures of the sensor (such as the optical dark region, etc.). Moreover, using the active pixels for black level calculation can obtain more realistic and accurate results than using other specific regions.

Figure 6:
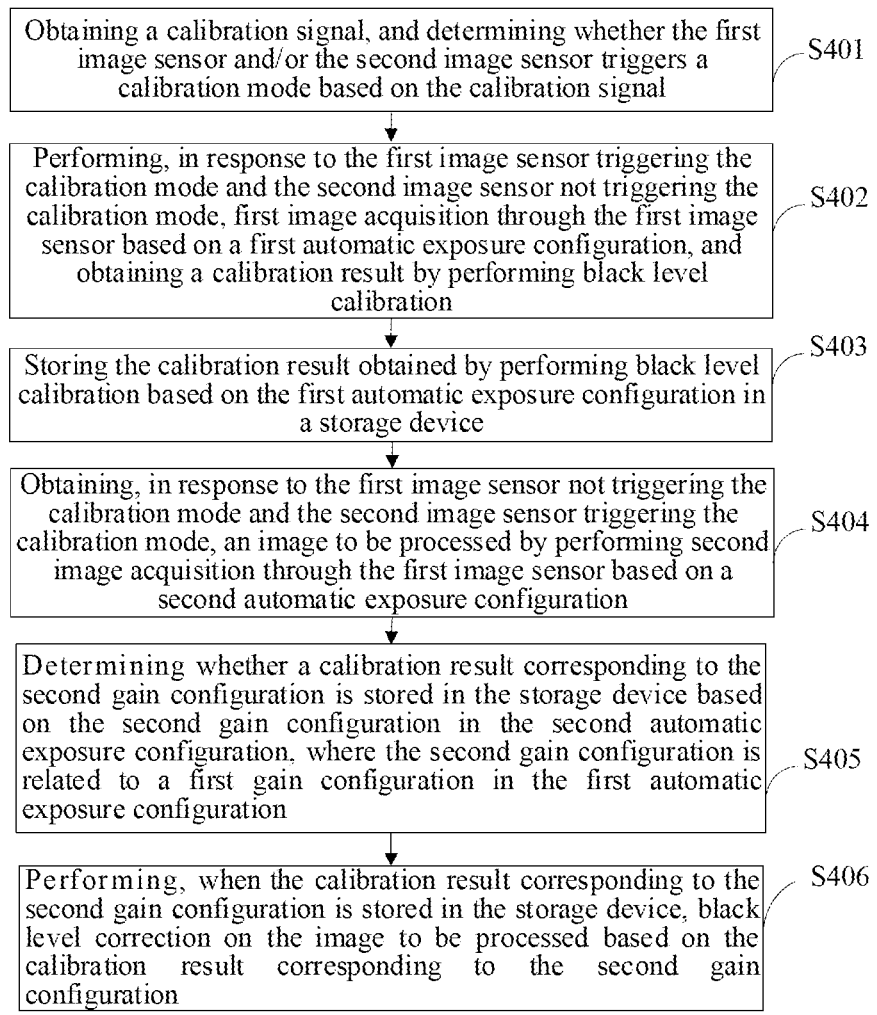
FIG. 6 is a flowchart of a method for black level correction according to some embodiments of the present disclosure.

Based on the embodiment shown in FIG. 3 or FIG. 4, FIG. 6 further shows a flowchart of a method for black level correction according to some embodiments of the present disclosure.

It should be noted that steps S405 to S406 in the embodiment of the present disclosure are further disclosures of step S204 or step S304 in the embodiment shown in FIG. 3 or FIG. 4.

Figure 7:
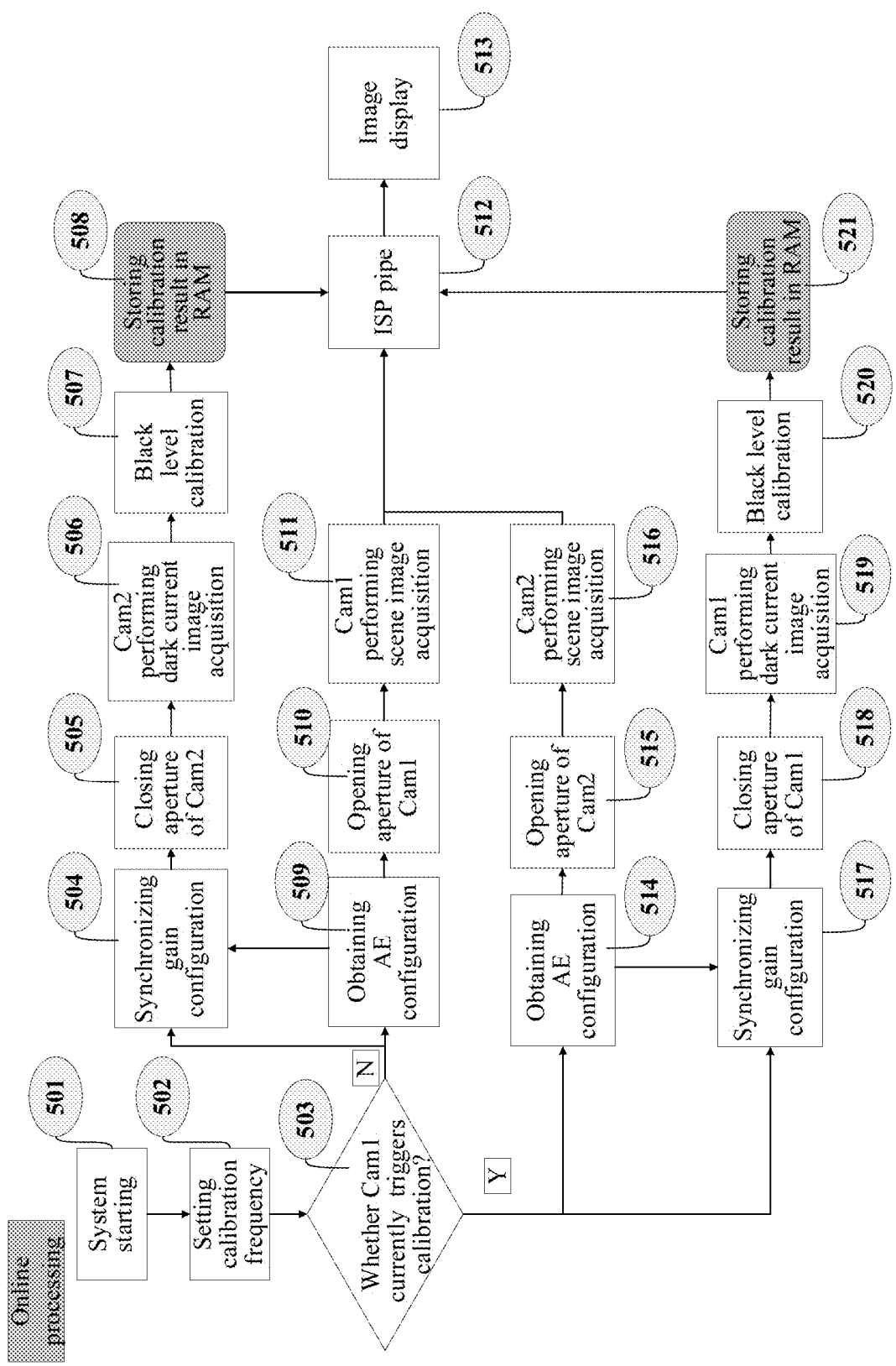
FIG. 7 is a schematic flowchart of a scheme for black level correction according to some embodiments of the present disclosure.

In order to facilitate understanding, FIG. 7 shows a flow chart of a scheme for black level correction according to some embodiments of the present disclosure. As shown in FIG. 7, Cam1 and Cam2 represent two different cameras in the terminal, Cam1 includes a first image sensor, and Cam2 includes a second image sensor. The present scheme is mainly used in the design and development process of ISP Pipeline, which belongs to the black level correction (BLC) link.

As shown in FIG. 6, the method includes the following steps.

In step S401, a calibration signal is obtained, and it is determined whether the first image sensor and/or the second image sensor triggers a calibration mode based on the calibration signal.

In some embodiments of the present disclosure, obtaining the calibration signal includes: setting a calibration frequency for the first image sensor and/or the second image sensor, where the calibration frequency at least includes a calibration acquisition frequency and a calibration acquisition frame number, where the calibration acquisition frame number is greater than or equal to 1; and, obtaining the calibration signal based on the calibration frequency, where the calibration signal is used to instruct the first image sensor and/or the second image sensor to start the calibration mode.

For the implementation of the embodiment of step S401, reference can be made to step S201 in the embodiment shown in FIG. 3 and step S301 in the embodiment shown in FIG. 4, which will not be repeated in the embodiments of the present disclosure.

In some embodiments of the present disclosure, as shown in FIG. 7, the calibration frequency is set through the device 502. The frequency determines the time interval for the first image sensor/the second image sensor to trigger the calibration mode, and the image frame number acquired during calibration. The device sends a calibration signal to the device 503 according to the set frequency. The device 503 determines whether Cam1 is in the calibration mode and selects the subsequent operation process according to the determined result.

Furthermore, in some embodiments, the subsequent processes such as 504 to 508 and 514 to 516 can be designed as a logic switch. The calibration signal is obtained based on the calibration frequency. By designing the bits of the calibration signal, the calibration signal can be used to indicate the activation of the logic switch. After the activation, the first image sensor and/or the second image sensor triggers the calibration mode, and performs the subsequent processes of 504 to 508 and 514 to 516.

In step S402, in response to the first image sensor triggering the calibration mode and the second image sensor not triggering the calibration mode, first image acquisition is performed through the first image sensor based on a first automatic exposure configuration, and a calibration result is obtained by performing black level calibration.

In some embodiments of the present disclosure, performing first image acquisition through the first image sensor based on a first automatic exposure configuration, and obtaining a calibration result by performing black level calibration includes: obtaining the first automatic exposure configuration, where the first automatic exposure configuration at least includes a first gain configuration; obtaining a non-photosensitive image by closing an aperture of the first image sensor and performing image acquisition on an active pixel region through the first image sensor based on the first automatic exposure configuration and the calibration acquisition frame number of the first image sensor; and, obtaining the calibration result by performing black level calibration on the non-photosensitive image.

In some embodiments of the present disclosure, obtaining the calibration result by performing black level calibration on the non-photosensitive image includes: obtaining a result image by performing time-domain superposition processing and averaging processing on the non-photosensitive image; and, taking a value of each pixel in the result image and the first gain configuration as the calibration result, where the value of each pixel in the result image is a black level value of each pixel in the image to be processed.

For the implementation of the embodiment of step S402, reference can be made to step S202 in the embodiment shown in FIG. 3 and step S302 in the embodiment shown in FIG. 4.

In some embodiments of the present disclosure, the step further includes: in response to the first image sensor triggering the calibration mode and the second image sensor not triggering the calibration mode, while performing black level calibration by the first image sensor, opening the aperture by the second image sensor based on the first automatic exposure configuration, performing normal image acquisition on the active pixel region, and sending the acquired image for display after being corrected.

In some embodiments of the present disclosure, as shown in FIG. 7, if Cam1 is in the calibration mode, then Cam2 is responsible for acquiring scene images to be displayed, and Cam1 is responsible for acquiring unresponsive images and performing black level calibration.

In some embodiments, after performing image acquisition according to processes 514 to 516, Cam2 proceeds to steps 512 and 513 for processing and sending for display. Cam1 performs black level data calibration according to processes 517 to 521. Among them, the device 514 obtains the exposure configuration of the automatic exposure feedback, and instructs the device 515 to open the aperture and adjust the aperture to a suitable position. The second image sensor directly acquires the scene image and sends it to the ISP pipe, that is, the device 512. In order to ensure that the brightness does not change suddenly during the switching process of the first image sensor and the second image sensor, Cam1 needs to synchronize the AE configuration of Cam2, especially the gain configuration, and then the device 518 closes the aperture of Cam1. At this time, the first image sensor corresponding to Cam1 can start to acquire unresponsive data and perform black level calibration.

In step S403, the calibration result obtained by performing black level calibration based on the first automatic exposure configuration is stored in a storage device.

It should be noted that the main reason for generation of the black level is that there is a dark current in the sensor circuit itself. When there is no light irradiation, the pixel unit also has a certain output voltage. The dark current is strongly related to the gain value. When the gain value increases, the gain of the circuit increases, and the dark current will also increase.

In some embodiments of the present disclosure, the calibration result includes the first gain configuration and corresponding black level calibration data. Step S402 is performed for more than one time, and the automatic exposure component is controlled to adjust the first gain configuration in the first automatic exposure configuration, so that the calibration result obtained by the first image sensor performing black level calibration under different first gain configurations may be acquired and stored in a storage device of the terminal. Different first gain configurations correspond to different calibration results.

Thus, for the image sent for display that is acquired by the second image sensor in step S402, the calibration result of black level calibration performed by the second image sensor under the first automatic exposure configuration can be searched for in the storage device for performing black level correction, where the calibration result of black level calibration performed by the second image sensor under the first automatic exposure configuration can be acquired in a previous batch of operations and stored in the storage device.

In some embodiments of the present disclosure, as shown in FIG. 7, the image data acquired by devices 511 and 516 is sent to device 512 for processing. Device 512 is the ISP Pipeline. The device sends the image data to the display device or storage device 513 after completing the black level calibration operation and other ISP processing of Cam2 by using the information in device 508, and sends the image data to the display device or storage device 513 after completing the black level calibration operation and other ISP processing of Cam1 by using the information in device 521.

In some embodiments, in order to ensure that the image to be processed and the calibration result used for correction are acquired by the same camera, when Cam1 is not in the calibration state, device 511 sends the scene acquired by Cam1 to device 512. At this time, device 512 needs to use the result in device 521 to complete the black level correction. Similarly, when Cam2 is not in the calibration state, the device 516 sends the image acquired by Cam2 to the device 512 for processing. At this time, the device 512 needs to use the data in the device 508 to complete the black level correction.

It can be understood that it is difficult to realize black level correction of the active pixels in real time due to the requirement of the display frame rate. In the application of the present scheme, online black level calibration of multi-sensor may be completed while ensuring that the frame rate of the image sent for display remains unchanged, through switch between multi-camera (such as Cam1 and Cam2).

In step S404, in response to the first image sensor not triggering the calibration mode and the second image sensor triggering the calibration mode, second image acquisition is performed through the first image sensor based on a second automatic exposure configuration, and an image to be processed is obtained.

In some embodiments of the present disclosure, performing second image acquisition through the first image sensor based on the second automatic exposure configuration and obtaining the image to be processed includes: obtaining the second automatic exposure configuration, where the second automatic exposure configuration at least includes a second gain configuration; and, obtaining the image to be processed by opening an aperture of the first image sensor and performing image acquisition on an active pixel region through an image sensor based on the second automatic exposure configuration.

For the implementation of step S404, reference can be made to step S203 in the embodiment shown in FIG. 3 and step S303 in the embodiment shown in FIG. 4, which will not be repeated in the embodiment of the present disclosure.

In some embodiments of the present disclosure, as shown in FIG. 7, if Cam1 is not in the calibration mode, then Cam1 is responsible for acquiring scene images to be displayed, and Cam2 is responsible for acquiring unresponsive images and performing black level calibration.

In some embodiments, after performing image acquisition according to processes 509 to 511, Cam1 proceeds to steps 512 and 513 for processing and sending for display. Cam2 performs black level data calibration according to processes 504 to 508 and writes the calibration result into the storage device. Among them, the device 509 obtains the exposure configuration of the automatic exposure feedback, and instructs the device 510 to open the aperture and adjust the aperture to a suitable position. In order to ensure that the brightness does not change suddenly during the switching process of the sensors, Cam2 needs to synchronize the AE configuration of Cam1, with a focus on the gain configuration, and then the device 505 closes the aperture of Cam2. At this time, the second image sensor corresponding to Cam2 can start to acquire unresponsive data and perform black level calibration. The device 508 is responsible for writing the calibration result and the gain configuration into the storage device In step S405, based on the second gain configuration in the second automatic exposure configuration, it is determined whether a calibration result corresponding to the second gain configuration is stored in the storage device, where the second gain configuration is related to the first gain configuration in the first automatic exposure configuration.

In step S406, when the calibration result corresponding to the second gain configuration is stored in the storage device, black level correction is performed on the image to be processed based on the calibration result corresponding to the second gain configuration.

In some embodiments, according to step S403, it can be known that different first gain configurations in the storage device correspond to different calibration results. In the embodiments of the present disclosure, the second gain configuration being related to the first gain configuration refers to that the second gain configuration is the same or nearly the same as the first gain configuration. Thus, based on the second gain configuration, it is possible to retrieve in the storage device whether there is a first gain configuration the same as the second gain configuration. Then, it is determined whether there is a calibration result corresponding to the second gain configuration stored in the storage device. If it is yes, the black level data corresponding to the second gain configuration is obtained from the calibration result, and the black level correction result of the image to be processed can be obtained by subtracting the data of the current image to be processed from the data representing the black level of each point.

In some embodiments of the present disclosure, the method further includes: when there is no calibration result corresponding to the second gain configuration stored in the storage device, determining a gain interval including the second gain configuration, where a boundary value of the gain interval is related to the first gain configuration; searching for a calibration result corresponding to the boundary value of the gain interval in the storage device; obtaining a calibration result corresponding to the second gain configuration by performing interpolation processing on the calibration result corresponding to the boundary value of the gain interval; and, performing black level correction on the image to be processed by using the calibration result corresponding to the second gain configuration.

In some embodiments, the gain interval including the second gain configuration is determined. The boundary value of the gain interval being related to the first gain configuration refers to that the boundary value of the gain interval is the same or nearly the same as the first gain configuration. The black level data corresponding to the current second gain is calculated by performing interpolation processing on the black level data of the endpoints of the interval. The black level correction result of the image to be processed can be obtained by subtracting the data of the current image to be processed from the data representing the black level of each point.

To sum up, the method for black level correction provided by the present disclosure has the following beneficial effects:

1. In the scheme of the present disclosure, it can be ensured that the display data frame rate is not affected by the black level calibration process by means of a flexible switching mechanism of the multi-camera system, thus ensuring the smoothness of displaying images.

2. The scheme of the present disclosure does not depend on the specific structures of the sensor, such the optical black region pixels or other pixels of the same type, and can perform calibration and correction through active pixels by reasonable control of the exposure component, which can be adapted to all sensors.

3. In the scheme of the present disclosure, the black level data is obtained through statistics of the active pixels, the data is more realistic and accurate, and it can better deal with the inconsistency of black level data in various parts of the screen caused by uneven temperature or the sensor processing process.

4. The black level data is counted by the ISP Pipeline and comes into effect, which can reduce the dependence on professionals/developers and reduce the subsequent maintenance costs of device.

Figure 8:
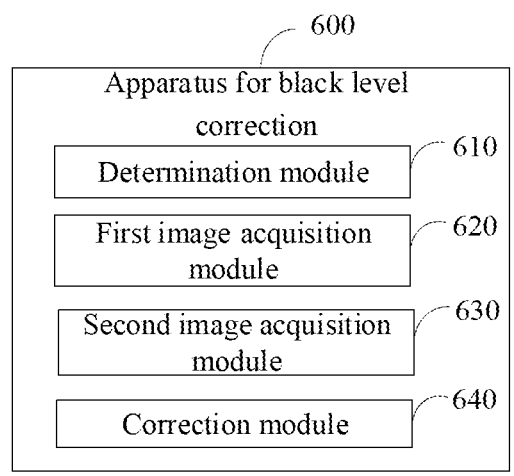
FIG. 8 is a schematic structural diagram of an apparatus for black level correction according to some embodiments of the present disclosure.

FIG. 8 is a schematic structural diagram of an apparatus 600 for black level correction according to some embodiments of the present disclosure. As shown in FIG. 8, the apparatus for black level correction includes a determination module 610, a first image acquisition module 620, a second image acquisition module 630 and a correction module 640.

The determination module 610 is configured to determine whether a first image sensor and/or a second image sensor triggers a calibration mode based on a calibration signal;

The first image acquisition module 620 is configured to, in response to the first image sensor triggering the calibration mode and the second image sensor not triggering the calibration mode, perform a first image acquisition through the first image sensor based on the first automatic exposure configuration, and obtain a calibration result by performing black level calibration;

The second image acquisition module 630 is configured to, in response to the first image sensor not triggering the calibration mode and the second image sensor triggering the calibration mode, obtain an image to be processed by performing second image acquisition through the first image sensor based on a second automatic exposure configuration;

The correction module 640 is configured to perform black level correction on the image to be processed based on the second automatic exposure configuration and the calibration result.

In some embodiments, obtaining the calibration signal includes: setting a calibration frequency for the first image sensor and/or the second image sensor, where the calibration frequency at least includes a calibration acquisition frequency and a calibration acquisition frame number, and the calibration acquisition frame number is greater than or equal to 1; and obtaining the calibration signal based on the calibration frequency, where the calibration signal is used to instruct the first image sensor and/or the second image sensor to start the calibration mode.

In some embodiments, the first image acquisition module 620 is configured to: obtain the first automatic exposure configuration, where the first automatic exposure configuration at least includes a first gain configuration; obtain a non-photosensitive image by closing an aperture of the first image sensor and performing image acquisition on an active pixel region through the first image sensor based on the first automatic exposure configuration and the calibration acquisition frame number of the first image sensor; and, obtain the calibration result by performing black level calibration on the non-photosensitive image.

In some embodiments, obtaining the calibration result by performing black level calibration on the non-photosensitive image includes: obtaining a result image by performing time-domain superposition processing and averaging processing on the non-photosensitive image; and, taking a value of each pixel in the result image and the first gain configuration as the calibration result, where the value of each pixel in the result image is a black level value of each pixel in the image to be processed.

In some embodiments, a storage module is further included, which is configured to store the calibration result obtained by performing black level calibration based on the first automatic exposure configuration in a storage device.

In some embodiments, the second image acquisition module 630 is configured to: obtain the second automatic exposure configuration, where the second automatic exposure configuration at least includes a second gain configuration; and, obtain the image to be processed by opening an aperture of the first image sensor and performing image acquisition on an active pixel region through an image sensor based on the second automatic exposure configuration.

In some embodiments, the correction module 640 is configured to: determine whether a calibration result corresponding to the second gain configuration is stored in the storage device based on the second gain configuration in the second automatic exposure configuration, where the second gain configuration is related to a first gain configuration in the first automatic exposure configuration; and, perform black level correction on the image to be processed based on the calibration result corresponding to the second gain configuration, when the calibration result corresponding to the second gain configuration is stored in the storage device.

In some embodiments, the correction module 640 is further configured to: determine a gain interval including the second gain configuration, when no calibration result corresponding to the second gain configuration is stored in the storage device, where a boundary value of the gain interval is related to the first gain configuration; search for a calibration result corresponding to the boundary value of the gain interval in the storage device; obtain a calibration result corresponding to the second gain configuration by performing interpolation processing on the calibration result corresponding to the boundary value of the gain interval; and, perform black level correction on the image to be processed by using the calibration result corresponding to the second gain configuration.

Since the apparatuses provided in the embodiments of the present disclosure correspond to the methods provided in the foregoing embodiments, the implementations of the method are also applicable to the apparatuses provided in this embodiment, and will not be described in detail in this embodiment.

To sum up, according to the apparatus for black level correction provided in the present disclosure, online calibration and correction on multi-sensor black level can be completed. By controlling the exposure component to perform calibration and correction in the active pixels, it is possible to get rid of the dependence on the specific structures of the sensor (such as the optical dark region, etc.). Moreover, using the active pixels for black level calculation can obtain more realistic and accurate results than using other specific regions.

In the above-mentioned embodiments provided in the present disclosure, the methods and apparatuses provided in the embodiments of the present disclosure are introduced. In order to realize the functions in the methods provided by the above embodiments of the present disclosure, the electronic device may include a hardware structure and a software module, to realize the above functions in the form of a hardware structure, a software module, or a hardware structure plus a software module. A certain function among the above-mentioned functions may be executed in the form of a hardware structure, a software module, or a hardware structure plus a software module.

Figure 9:
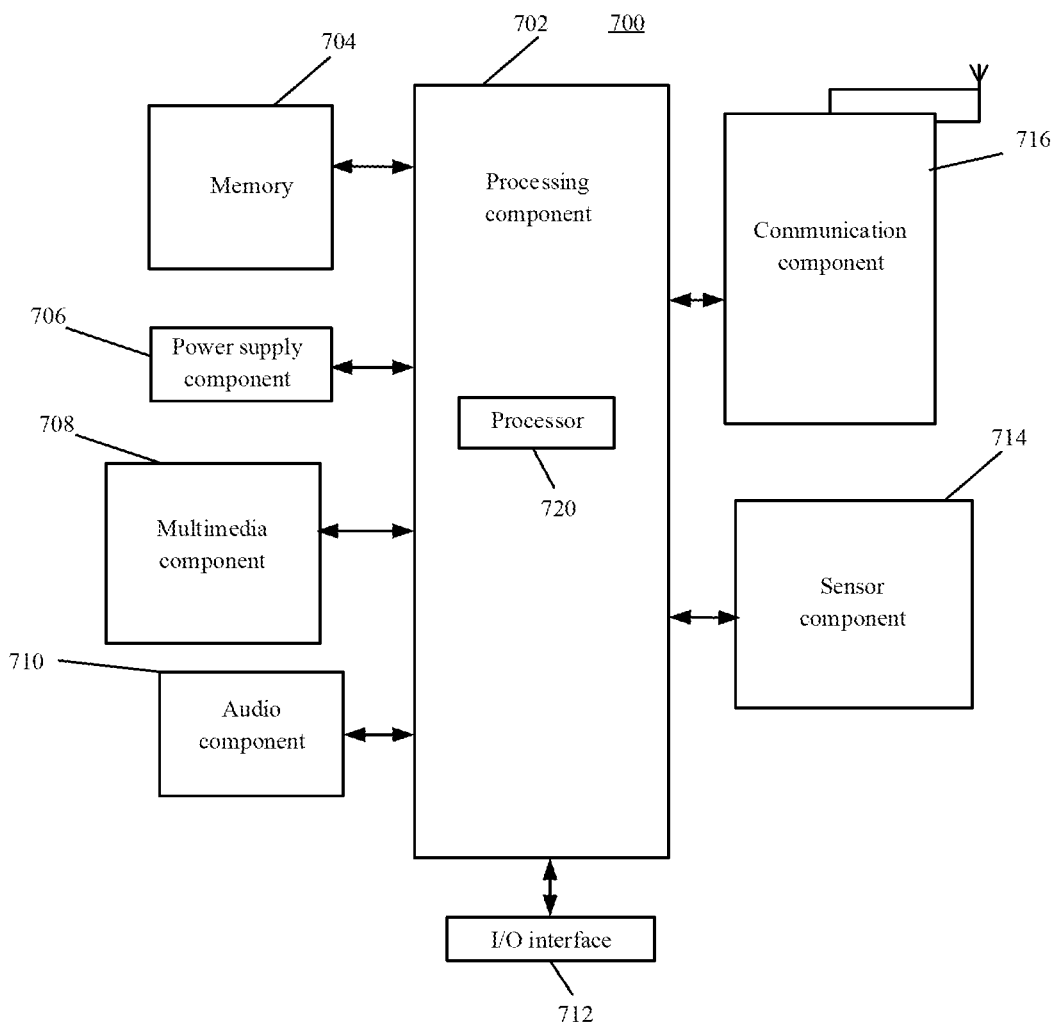
FIG. 9 is a schematic structural diagram of an electronic device according to some embodiments of the present disclosure.

FIG. 9 is a block diagram of an electronic device 700 for implementing the above method for black level correction according to an example embodiment. For example, electronic device 700 may be a mobile phone, a computer, a messaging device, a game console, a tablet device, a medical device, a fitness device, a personal digital assistant, and the like.

Referring to FIG. 9, electronic device 700 may include one or more of the following components: a processing component 702, a memory 704, a power supply component 706, a multimedia component 708, an audio component 710, an input/output (I/O) interface 712, a sensor component 714, and a communication component 716.

The processing component 702 generally controls the overall operations of the electronic device 700, such as operations associated with display, telephone calls, data communications, camera operations, and recording operations. The processing component 702 may include one or more processors 720 to execute instructions to complete all or part of the steps of the above method. Additionally, the processing component 702 may include one or more modules that facilitate interaction between the processing component 702 and other components. For example, the processing component 702 may include a multimedia module to facilitate interaction between the multimedia component 708 and the processing component 702.

The memory 704 is configured to store various types of data to support operations at the electronic device 700. Examples of such data include instructions for any application program or method operating on the electronic device 700, contact data, phonebook data, messages, images, videos, and the like. The memory 704 can be realized by any type of volatile or non-volatile storage devices or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk.

The power supply component 706 provides power to various components of the electronic device 700. The power supply component 706 may include a power management system, one or more power supplies, and other components associated with generating, managing, and distributing power for the electronic device 700.

The multimedia component 708 includes a screen that provides an output interface between the electronic device 700 and a user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touches, swipes, and gestures on the touch panel. The touch sensor may not only sense a boundary of a touch action or a swipe action, but also detect duration and pressure associated with the touch operation or swipe operation. In some embodiments, the multimedia component 708 includes a front camera and/or a rear camera. When the electronic device 700 is in an operation mode, such as a shooting mode or a video mode, the front camera and/or the rear camera can receive external multimedia data. Each front camera and rear camera can be a fixed optical lens system or have focal length and optical zoom capability.

The audio component 710 is configured to output and/or input audio signals. For example, the audio component 710 includes a microphone (MIC), which is configured to receive an external audio signal when the electronic device 700 is in an operation mode, such as a calling mode, a recording mode and a voice recognition mode. Received audio signals may be further stored in memory 704 or sent via the communication component 716. In some embodiments, the audio component 710 also includes a speaker for outputting audio signals.

The I/O interface 712 provides an interface between the processing component 702 and peripheral interface modules, which may be keyboards, click wheels, buttons, and the like. These buttons may include, but are not limited to: a home button, a volume button, a start button, and a lock button.

The sensor component 714 includes one or more sensors for providing status assessments of various aspects of the electronic device 700. For example, the sensor component 714 can detect the open/closed state of the electronic device 700, the relative positioning of components, such as the display and the keypad of the electronic device 700. The sensor component 714 can also detect position changes of the electronic device 700 or a component of the electronic device 700, presence or absence of a contact between the user and the electronic device 700, orientation or acceleration/deceleration of the electronic device 700, and temperature changes of electronic device 700. The sensor component 714 may include a proximity sensor configured to detect the presence of nearby objects in the absence of any physical contact. The sensor component 714 may also include an optical sensor, such as a CMOS or CCD image sensor, for use in imaging applications. In some embodiments, the sensor component 714 may also include an acceleration sensor, a gyroscope sensor, a magnetic sensor, a pressure sensor or a temperature sensor.

The communication component 716 is configured to facilitate wired or wireless communication between the electronic device 700 and other devices. The electronic device 700 can access a wireless network based on a communication standard, such as WiFi, 2G or 3G, 4G LTE, 5G NR (New Radio) or their combination. In an example embodiment, the communication component 716 receives broadcast signals or broadcast related information from an external broadcast management system via a broadcast channel. In an example embodiment, the communication component 716 also includes a near field communication (NFC) module to facilitate short-range communication. For example, the NFC module can be implemented based on radio frequency identification (RFID) technology, infrared data association (IrDA)technology, ultra-wideband (UWB) technology, bluetooth (BT) technology and other technologies.

In an example embodiment, the electronic device 700 may be implemented by one or more application specific integrated circuits (ASIC), digital signal processors (DSP), digital signal processing devices (DSPD), programmable logic devices (PLD), field programmable a programmable gate arrays (FPGA), controllers, microcontrollers, microprocessors or other electronic components, for performing the method described above.

In an example embodiment, there is also provided a non-transitory computer-readable storage medium including instructions, such as the memory 704 including instructions which can be executed by the processor 720 of the electronic device 700 to complete the above method. For example, the non-transitory computer-readable storage medium may be a ROM, a random access memory (RAM), a CD-ROM, a magnetic tape, a floppy disk, and an optical data storage device, and the like.

According to some embodiments of the present disclosure, there is further provided a non-transitory computer-readable storage medium storing with computer instructions, where the computer instructions are used for a computer to execute the method for black level correction described in the above-mentioned embodiments of the present disclosure.

According to some embodiments of the present disclosure, there is further provided a computer program product, including a computer program, and the computer program is executed by a processor to perform the method for black level correction described in the above embodiments of the present disclosure.

According to some embodiments of the present disclosure, there is further provided a chip, which includes one or more interface circuits and one or more processors; the interface circuit is used to receive code instructions and transmit them to the processor, and the processor is configured to run the code instructions to execute the method for black level correction described in the above embodiments of the present disclosure.

The present disclosure provides a method for black level correction, an apparatus, an electronic device, a chip and a storage medium to solve the problems in the related art, providing real-time calibration and correction of black level, and avoiding decreased performance of color and permeability of the image caused by the black level data not matching the previous offline calibration data after the black level data change with factors such as gain configuration, ambient temperature, and device usage time.

According to embodiments of a first aspect of the present disclosure, there is provided a method for black level correction, the method is executed by a terminal, the terminal comprises a first image sensor and a second image sensor, and the method includes: obtaining a calibration signal, and determining whether the first image sensor and/or the second image sensor triggers a calibration mode based on the calibration signal; performing, in response to the first image sensor triggering the calibration mode and the second image sensor not triggering the calibration mode, first image acquisition through the first image sensor based on a first automatic exposure configuration, and obtaining a calibration result by performing black level calibration; obtaining, in response to the first image sensor not triggering the calibration mode and the second image sensor triggering the calibration mode, an image to be processed by performing second image acquisition through the first image sensor based on a second automatic exposure configuration; and performing black level correction on the image to be processed based on the second automatic exposure configuration and the calibration result.

In some embodiments of the present disclosure, obtaining a calibration signal includes: setting a calibration frequency for the first image sensor and/or the second image sensor, where the calibration frequency at least includes a calibration acquisition frequency and a calibration acquisition frame number, and the calibration acquisition frame number is greater than or equal to 1; and obtaining the calibration signal based on the calibration frequency, where the calibration signal is used to instruct the first image sensor and/or the second image sensor to start the calibration mode.

In some embodiments of the present disclosure, performing first image acquisition through the first image sensor based on a first automatic exposure configuration, and obtaining a calibration result by performing black level calibration includes: obtaining the first automatic exposure configuration, where the first automatic exposure configuration at least includes a first gain configuration; obtaining a non-photosensitive image by closing an aperture of the first image sensor and performing image acquisition on an active pixel region through the first image sensor based on the first automatic exposure configuration and the calibration acquisition frame number of the first image sensor; and obtaining the calibration result by performing black level calibration on the non-photosensitive image.

In some embodiments of the present disclosure, obtaining the calibration result by performing black level calibration on the non-photosensitive image includes: obtaining a result image by performing time-domain superposition processing and averaging processing on the non-photosensitive image; and taking a value of each pixel in the result image and the first gain configuration as the calibration result, where the value of each pixel in the result image is a black level value of each pixel in the image to be processed.

In some embodiments of the present disclosure, the method further includes: storing the calibration result obtained by performing black level calibration based on the first automatic exposure configuration in a storage device.

In some embodiments of the present disclosure, obtaining an image to be processed by performing second image acquisition through the first image sensor based on a second automatic exposure configuration includes: obtaining the second automatic exposure configuration, where the second automatic exposure configuration at least includes a second gain configuration; and obtaining the image to be processed by opening an aperture of the first image sensor and performing image acquisition on an active pixel region through an image sensor based on the second automatic exposure configuration.

In some embodiments of the present disclosure, performing black level correction on the image to be processed based on the second automatic exposure configuration and the calibration result includes: determining whether a calibration result corresponding to the second gain configuration is stored in the storage device based on the second gain configuration in the second automatic exposure configuration, where the second gain configuration is related to a first gain configuration in the first automatic exposure configuration; and performing, when the calibration result corresponding to the second gain configuration is stored in the storage device, black level correction on the image to be processed based on the calibration result corresponding to the second gain configuration.

In some embodiments of the present disclosure, the method further includes: determining, when no calibration result corresponding to the second gain configuration is stored in the storage device, a gain interval including the second gain configuration, where a boundary value of the gain interval is related to the first gain configuration; searching for a calibration result corresponding to the boundary value of the gain interval in the storage device; obtaining a calibration result corresponding to the second gain configuration by performing interpolation processing on the calibration result corresponding to the boundary value of the gain interval; and performing black level correction on the image to be processed by using the calibration result corresponding to the second gain configuration.

According to embodiments of a second aspect of the present disclosure, there is provided an apparatus for black level correction, the apparatus includes: a determination module, configured to determine whether a first image sensor and/or a second image sensor triggers a calibration mode based on a calibration signal; a first image acquisition module, configured to perform, in response to the first image sensor triggering the calibration mode and the second image sensor not triggering the calibration mode, first image acquisition through the first image sensor based on a first automatic exposure configuration, and obtain a calibration result by performing black level calibration; a second image acquisition module, configured to obtain, in response to the first image sensor not triggering the calibration mode and the second image sensor triggering the calibration mode, an image to be processed by performing second image acquisition through the first image sensor based on a second automatic exposure configuration; and a correction module, configured to perform black level correction on the image to be processed based on the second automatic exposure configuration and the calibration result.

According to embodiments of a third aspect of the present disclosure, there is provided an electronic device, including at least one processor and a memory communicatively connected to the at least one processor; where, the memory stores with an instruction executable by the at least one processor, and the instruction is executed by at least one processor to enable the at least one processor to execute the method according to the embodiments of the first aspect of the present disclosure.

According to embodiments of a fourth aspect of the present disclosure, there is provided a non-transitory computer-readable storage medium storing with a computer instruction, where the computer instruction is configured to enable a computer to execute the method according to the embodiments of the first aspect of the present disclosure.

According to embodiments of a fifth aspect of the present disclosure, there is provided a chip. The chip includes one or more interface circuits and one or more processors; the interface circuits are configured to receive code instructions and transmit the code instructions to the processors, and the processors are configured to run the code instructions to execute the method according to the embodiment of the first aspect of the present disclosure.

To sum up, the method for black level correction provided in the present disclosure is executed by a terminal, the terminal includes a first image sensor and a second image sensor, and the method includes: obtaining a calibration signal, and determining whether the first image sensor and/or the second image sensor triggers a calibration mode based on the calibration signal; in response to the first image sensor triggering the calibration mode and the second image sensor not triggering the calibration mode, performing first image acquisition through the first image sensor based on a first automatic exposure configuration, and obtaining a calibration result by performing black level calibration; in response to the first image sensor not triggering the calibration mode and the second image sensor triggering the calibration mode, obtaining an image to be processed by performing second image acquisition through the first image sensor based on a second automatic exposure configuration; and performing black level correction on the image to be processed based on the second automatic exposure configuration and the calibration result. The present scheme provides real-time calibration and correction of black level, avoiding decreased performance of color and permeability of the image caused by the black level data not matching the previous offline calibration data after the black level data change with factors such as gain configuration, ambient temperature, and device usage time.

It should be noted that the terms "first" and "second" in the specification and claims of the present disclosure and the above drawings are used to distinguish similar objects, but not necessarily used to describe a specific order or sequence. It should be understood that the data so used are interchangeable under appropriate circumstances such that the embodiments of the present disclosure described here can be implemented in sequences other than those as illustrated or described here. The implementations described in the following example examples do not represent all implementations consistent with the present disclosure. On the contrary, they are examples of apparatuses and methods consistent with aspects of the present disclosure as recited in the appended claims.

In the description of this specification, descriptions of the reference terms "one embodiment", "some embodiments", "example embodiments", "example", "specific examples" or "some examples" mean that specific features, structures, materials, or characteristics described in combination with the embodiments or examples are included in at least one embodiment or example of the present disclosure. In this specification, schematic representations of the above terms do not necessarily refer to the same embodiment or example. Furthermore, the described specific features, structures, materials or characteristics may be combined in any suitable manner in any one or more embodiments or examples.

Any process or method description in the flowcharts or otherwise described here may be understood to represent modules, segments or portions of code including one or more executable instructions for implementing specific logical functions or steps of the process. and the scope of preferred embodiments of the present disclosure includes alternative implementations in which functions may be performed out of the order shown or discussed, such as in a basically simultaneous manner or in a reverse order depending on the functions involved, which should be understood by those skilled in the art to which the embodiments of the present disclosure belong.

Logics and/or steps represented in the flowcharts or otherwise described here, for example, can be considered as a sequenced listing of executable instructions for implementing logical functions, and can be embodied in any computer-readable medium, for use in instruction execution systems, apparatuses, or devices (such as computer-based systems, systems including processing modules, or other systems that can obtain instructions from instruction execution systems, apparatuses, or devices and execute the instructions), or for use in conjunction with these instruction execution systems, apparatuses or devices. For the purposes of this specification, a " computer-readable medium " may be any apparatus that can contain, store, communicate, propagate or transmit a program for use in or in conjunction with an instruction execution system, apparatus or device. More specific examples (non-exhaustive list) of the computer-readable medium include the following: an electrical connection with one or more wires (a control method), a portable computer disk case (a magnetic apparatus), a random access memory (RAM), a read-only memory (ROM), an erasable programmable read-only memory (EPROM or a flash memory), an fiber optic apparatus, and a portable compact disc read-only memory (CDROM). In addition, the computer-readable medium may even be a paper or other suitable medium on which the program may be printed, as the program may be obtained electronically, for example, by optically scanning the paper or other medium, followed by editing, interpretation or processing in other suitable ways if needed, and be stored in the computer memory.

It should be understood that each part of the embodiments of the present disclosure may be implemented by using a hardware, a software, a firmware or their combination. In the embodiments described above, a plurality of steps or methods may be implemented by the software or the firmware stored in a memory and executed by a suitable instruction execution system. For example, if implemented by using a hardware, as in another embodiment, it can be implemented by any one or combination of the following techniques commonly known in the art; a discrete logic circuit with logic gate circuits for implementing logic functions on data signals, an application specific integrated circuit with suitable combinational logic gates, a programmable gate array (PGA), a field programmable gate array (FPGA), etc.

Those skilled in the art can understand that all or part of the steps carried by the methods of the above embodiments can be completed by instructing the related hardware through a program, and the program can be stored in a computer-readable storage medium. When the program is executed, one or a combination of steps of the method embodiments are implemented.

In addition, each functional unit in each embodiment of the present disclosure may be integrated into one processing module, each unit may separately exist physically, or two or more units may be integrated into one module. The above-mentioned integrated module can be implemented in the form of a hardware or in the form of a software function module. If the integrated module is realized in the form of a software function module and sold or used as an independent product, it can also be stored in a computer-readable storage medium. The storage medium mentioned above may be a read-only memory, a magnetic disk or an optical disk, and the like.

Although the embodiments of the present disclosure have been shown and described above, it can be understood that the above embodiments are exemplary and should not be construed as a limitation of the present disclosure. Those skilled in the art can make changes, modifications, substitutions and variations of the above embodiments within the scope of the present disclosure.

The invention claimed is:

1. A method for black level correction, comprising:
   determining, by a terminal comprising a first image sensor and a second image sensor, whether the first image sensor and/or the second image sensor triggers a calibration mode based on a calibration signal;
   performing, in response to the first image sensor triggering the calibration mode and the second image sensor not triggering the calibration mode, first image acquisition through the first image sensor based on a first automatic exposure configuration, and obtaining a calibration result by performing black level calibration;
   obtaining, in response to the first image sensor not triggering the calibration mode and the second image sensor triggering the calibration mode, an image to be processed by performing second image acquisition through the first image sensor based on a second automatic exposure configuration; and
   performing black level correction on the image to be processed based on the second automatic exposure configuration and the calibration result;
   wherein the method further comprises:
   setting a calibration frequency for the first image sensor and/or the second image sensor, wherein the calibration frequency at least comprises a calibration acquisition frequency and a calibration acquisition frame number, and the calibration acquisition frame number is greater than or equal to 1; and
   obtaining the calibration signal based on the calibration frequency, wherein the calibration signal is used to instruct the first image sensor and/or the second image sensor to start the calibration mode.

2. The method according to claim 1, wherein performing first image acquisition through the first image sensor based on a first automatic exposure configuration, and obtaining a calibration result by performing black level calibration comprises:
   obtaining the first automatic exposure configuration, wherein the first automatic exposure configuration at least comprises a first gain configuration;
   obtaining a non-photosensitive image by closing an aperture of the first image sensor and performing image acquisition on an active pixel region through the first image sensor based on the first automatic exposure configuration and the calibration acquisition frame number of the first image sensor; and
   obtaining the calibration result by performing black level calibration on the non-photosensitive image.

3. The method according to claim 2, wherein obtaining the calibration result by performing black level calibration on the non-photosensitive image comprises:
   obtaining a result image by performing time-domain superposition processing and averaging processing on the non-photosensitive image; and
   taking a value of a pixel in the result image and the first gain configuration as the calibration result, wherein the value of the pixel in the result image comprises a black level value of the pixel in the image to be processed.

4. The method according to claim 2, wherein obtaining the calibration result by performing black level calibration on the non-photosensitive image comprises:
   setting the calibration acquisition frame number to 1;
   performing black level calibration in a way of space-domain calibration; and
   performing averaging processing on the non-photosensitive image to obtain a result image.

5. The method according to claim 2, wherein obtaining the calibration result by performing black level calibration on the non-photosensitive image comprises:
   setting the calibration acquisition frame number to a plurality of frames;
   performing black level calibration in a way of time-domain calibration; and
   performing time-domain superposition processing and averaging processing the non -photosensitive image to obtain a result image.

6. The method according to claim 2, wherein the calibration result comprises the first gain configuration and corresponding black level calibration data.

7. The method according to claim 1, wherein the calibration acquisition frequency is a time interval for the first image sensor and/or the second image sensor to trigger the calibration mode, and the calibration acquisition frame number is an image frame number acquired by the first image sensor and/or the second image sensor during calibration.

8. The method according to claim 1, further comprising:
   storing the calibration result obtained by performing black level calibration based on the first automatic exposure configuration in a storage device.
9. The method according to claim 1, obtaining an image to be processed by performing second image acquisition through the first image sensor based on a second automatic exposure configuration comprises:
   obtaining the second automatic exposure configuration, wherein the second automatic exposure configuration at least comprises a second gain configuration; and
   obtaining the image to be processed by opening an aperture of the first image sensor and performing image acquisition on an active pixel region through an image sensor based on the second automatic exposure configuration.
10. The method according to claim 9, wherein performing black level correction on the image to be processed based on the second automatic exposure configuration and the calibration result comprises:
    determining whether a calibration result corresponding to the second gain configuration is stored in a storage device based on the second gain configuration in the second automatic exposure configuration, wherein the second gain configuration is related to a first gain configuration in the first automatic exposure configuration; and
    performing, in response to determining that the calibration result corresponding to the second gain configuration is stored in the storage device, black level correction on the image to be processed based on the calibration result corresponding to the second gain configuration.
11. The method according to claim 10, further comprising:
    determining, in response to determining that no calibration result corresponding to the second gain configuration is stored in the storage device, a gain interval comprising the second gain configuration, wherein a boundary value of the gain interval is related to the first gain configuration;
    obtaining a calibration result corresponding to the boundary value of the gain interval in the storage device;
    obtaining a calibration result corresponding to the second gain configuration by performing interpolation processing on the calibration result corresponding to the boundary value of the gain interval; and
    performing black level correction on the image to be processed by using the calibration result corresponding to the second gain configuration.
12. The method according to claim 10, wherein the second gain configuration being related to a first gain configuration in the first automatic exposure configuration comprises:
    the second gain configuration being the same or nearly the same as the first gain configuration.
13. The method according to claim 10, wherein performing, in response to determining that the calibration result corresponding to the second gain configuration is stored in the storage device, black level correction on the image to be processed based on the calibration result corresponding to the second gain configuration comprises:
    obtaining black level data corresponding to the second gain configuration from the calibration result; and
    obtaining a black level correction result of the image to be processed by subtracting data of the image to be processed from the black level data.
14. The method according to claim 1, wherein the calibration signal is set according to a time interval for the first image sensor and/or the second image sensor to trigger the calibration mode and an image frame number acquired by the first image sensor and/or the second image sensor during calibration.
15. The method according to claim 1, wherein the first automatic exposure configuration is obtained by synchronizing an automatic exposure configuration during normal operation of the second image sensor.
16. The method according to claim 1, wherein the second automatic exposure configuration is obtained according to current setting of the terminal.
17. The method according to claim 1, wherein performing, in response to the first image sensor triggering the calibration mode and the second image sensor not triggering the calibration mode, first image acquisition through the first image sensor based on a first automatic exposure configuration, and obtaining a calibration result by performing black level calibration further comprises:
    performing normal image acquisition on an active pixel region through the second image sensor based on the first automatic exposure configuration by opening an aperture; and
    sending an acquired image for display after being corrected.
18. A non-transitory computer-readable storage medium, storing with a computer instruction, wherein the computer instruction is configured to enable a computer to execute a method for black level correction, comprising:
    determining whether a first image sensor and/or a second image sensor triggers a calibration mode based on a calibration signal;
    performing, in response to the first image sensor triggering the calibration mode and the second image sensor not triggering the calibration mode, first image acquisition through the first image sensor based on a first automatic exposure configuration, and obtaining a calibration result by performing black level calibration;
    obtaining, in response to the first image sensor not triggering the calibration mode and the second image sensor triggering the calibration mode, an image to be processed by performing second image acquisition through the first image sensor based on a second automatic exposure configuration; and
    performing black level correction on the image to be processed based on the second automatic exposure configuration and the calibration result;
    wherein the method further comprises:
    setting a calibration frequency for the first image sensor and/or the second image sensor, wherein the calibration frequency at least comprises a calibration acquisition frequency and a calibration acquisition frame number, and the calibration acquisition frame number is greater than or equal to 1; and
    obtaining the calibration signal based on the calibration frequency, wherein the calibration signal is used to instruct the first image sensor and/or the second image sensor to start the calibration mode.
19. A chip, wherein the chip comprises one or more interface circuits and one or more processors, the interface circuits are configured to receive code instructions and transmit the code instructions to the processors, and the processors are configured to run the code instructions to execute a method for black level correction, comprising:

determining whether a first image sensor and/or a second image sensor triggers a calibration mode based on a calibration signal;

performing, in response to the first image sensor triggering the calibration mode and the second image sensor not triggering the calibration mode, first image acquisition through the first image sensor based on a first automatic exposure configuration, and obtaining a calibration result by performing black level calibration;

obtaining, in response to the first image sensor not triggering the calibration mode and the second image sensor triggering the calibration mode, an image to be processed by performing second image acquisition through the first image sensor based on a second automatic exposure configuration; and performing black level correction on the image to be processed based on the second automatic exposure configuration and the calibration result;

wherein the method further comprises:

setting a calibration frequency for the first image sensor and/or the second image sensor, wherein the calibration frequency at least comprises a calibration acquisition frequency and a calibration acquisition frame number, and the calibration acquisition frame number is greater than or equal to 1; and obtaining the calibration signal based on the calibration frequency, wherein the calibration signal is used to instruct the first image sensor and/or the second image sensor to start the calibration mode.

* * * * *